Feb. 4, 1936.    H. V. REED    2,029,339
CLUTCH PLATE
Filed Jan. 13, 1932
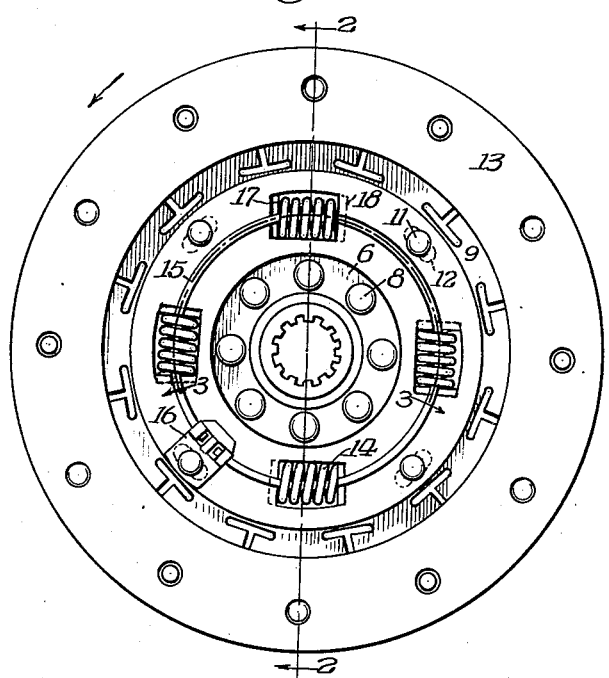
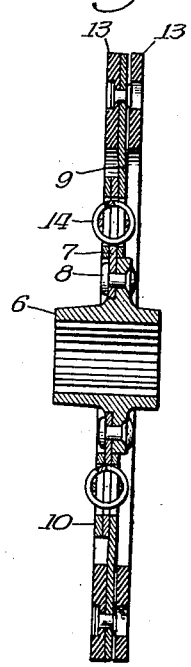
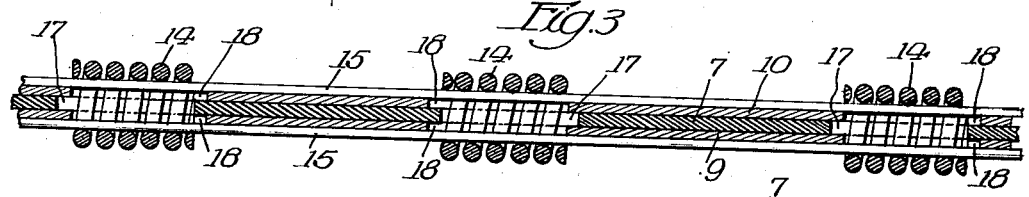
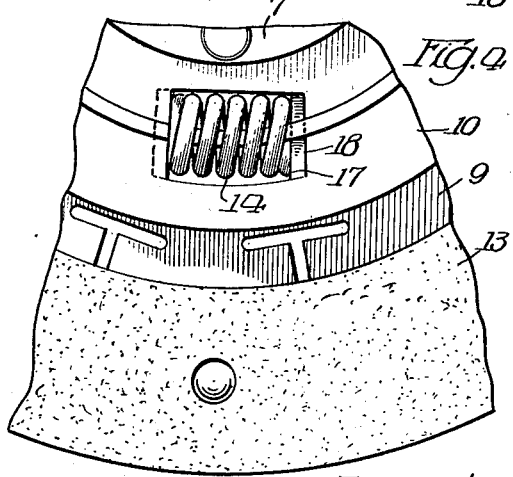
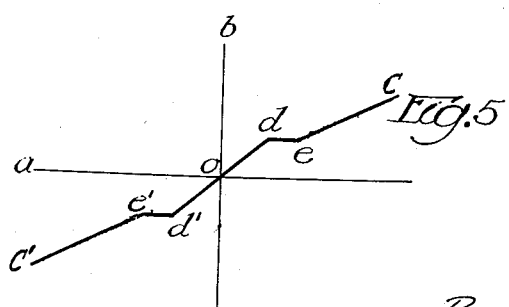
Inventor
Harald V. Reed
By Wm. O. Bell    Attys.

Patented Feb. 4, 1936

2,029,339

UNITED STATES PATENT OFFICE 2,029,339

CLUTCH PLATE

Harold V. Reed, Chicago, Ill., assignor, by mesne assignments, to Borg-Warner Corporation, Chicago, Ill., a corporation of Illinois Application January 13, 1932, Serial No. 586,253

18 Claims. (Cl. 192—68)

This invention relates to friction clutches for automotive vehicles but it may also be used in other friction clutches for which it is or may be adapted. The invention further relates to certain improvements over the subject matter of my co-pending application entitled "Clutch plates" bearing Serial Number 581,179.

The primary objects of the invention are to provide a novel clutch which will take hold easily and smoothly without shock or jar and which will dampen the vibrations ordinarily transmitted through the clutch.

Another object of the invention is to provide a clutch or driven plate with a cushion comprising a plurality of springs disposed in a substantially circular arrangement and which will act continuously but compress in stages and provide a uniformly progressive cushion effect.

And a further object of the invention is to provide a clutch or driven plate with a spring cushion which will always start its deflection curve at the same point of origin by mounting the springs in the plate under compression and in equilibrium and thereby overcome inaccuracies in mounting the springs and variations in initial strength of the springs.

In the accompanying drawing I have illustrated the invention in a selected embodiment and referring thereto Fig. 1 is an elevation of a clutch plate having a spring cushion composed of four springs to operate in stages when the engine is driving and when it is braking.

Fig. 2 is a sectional view on the line 2—2 of Fig. 1.

Fig. 3 is an enlarged detail sectional view on the line 3—3 of Fig. 1.

Fig. 4 is an enlarged fragmentary view, and

Fig. 5 is a chart showing the characteristics of the deflection curves of the clutch plate.

Referring to the drawing, the clutch or driven plate comprises a hub 6 and a hub member 7 which is rigidly secured to the hub by rivets 8; a friction member 9; and a cover ring 10. The friction member and the cover ring are arranged on opposite sides of the hub member, and the cover ring is considered a part of the friction member being rigidly connected thereto by rivets 11 which pass through elongated openings 12 in the hub member whereby the friction member and the cover ring are capable of limited conjoint rotative movement relative to the hub member. Facing rings 13 of suitable friction material are secured on opposite sides of the friction member, but loose or sectional rings may be used if preferred. A plurality of coil springs 14 are all arranged preferably under an initial compression in pockets formed by openings in the hub member, the friction member, and the cover ring, and they may be retained in place by any suitable manner as, for example, by wires 15, the ends of the wires being secured in place by suitable clamp devices 16. I have shown and described these parts in a preferred form but the invention is not limited thereto and they may be made in various forms without departing from the invention. The pocket openings in the friction member, including the cover ring, and the hub member are of uniform length and the openings in the hub member are equally spaced but the openings in the friction member, including the cover ring, are arranged in symmetrical groups and the groups are unequally spaced. This will be more readily seen in Fig. 3 wherein the openings 17 in the hub member are equally spaced and the openings 18 in the friction member are unequally spaced. The springs are arranged in the pockets formed by the openings and engage the end walls of the pockets. When the clutch plate shown in the drawing is at rest one group of springs has the forward end of each spring engaging the end wall of the opening in the hub member and its rear end engaging the end wall of the opening in the friction member, and the other group of springs has the forward end of each spring engaging the end wall of the opening in the friction member and its rear end engaging the end wall of the opening in the hub member. Each spring in each group adds to the effect of the other spring in the same group and therefore each spring supplements each other spring in the same group. Each group of springs acts in a manner opposite to that of the other group to produce equilibrium of the groups, and therefore each group complements the other group. Therefore the springs will be held in the pockets under compression, and the groups in equilibrium, and this will be true regardless of any imperfections in the length of the openings or variations in the initial strength of the springs. The springs will be under different degrees of compression when installed by reason of the imperfections and variations which are unavoidable in commercial production but the groups will be in perfect equilibrium as the imperfections and variations will be compensated for by the opposing forces of the groups, the stronger group causing relative movement of the hub member and the friction member until the springs of this group have expanded and the springs of the weaker group have compressed to the point where the forces exerted by both groups are equal. The equalizing movement of the hub and friction members will be slight as it is intended that the length of the openings and the length and strength of the springs be as uniform as is possible and practical in commercial production.

The drawing shows the clutch plate at rest as it would be when the clutch is thrown out, and when the clutch is thrown in and movement is imparted in the direction of the arrow, Fig. 1, to the friction member, the springs which have their forward ends engaged with the end walls of the openings in the friction member will expand, and the springs which have their forward ends in engagement with the end walls of the openings in the hub member will compress until the end walls of the openings in the friction member and the hub member for the first-mentioned set of springs come into registration. Continued force applied to the friction member will not cause further compression of the compressed springs or compression of the expanded springs until the normal compression of the expanded springs has been overcome whereupon these expanded springs come under compression and the compressed springs are further compressed. I have described the operation of the clutch plate in one direction of movement of the engine, when the engine is driving, or when the engine is braking; when the engine is operating in the opposite manner the operation of the clutch plate will be reverse to that described.

Fig. 5 shows the deflection curves of the clutch plate, $a$ being the load line, $b$ being the deflection line, and $o$ indicating zero. The line $o, c$ shows the characteristics of the deflection curve when the engine is driving and the line $o, c'$ shows the characteristics of the deflection curve when the engine is braking; $o, d$ and $o, d'$ indicate the characteristics of the curves when the engine is driving and when the engine is braking while one group of springs is compressed and another group is expanding; the lines $d, e$ and $d', e'$ indicate the characteristics of the curves while the initial compression of the expanded springs is being overcome; and the lines $e, c$ and $e', c'$ indicate the characteristics of the curves when all the springs are compressing. If one group of springs is not under initial compression and the other group is under initial compression, one of the horizontal lines $d, e$ or $d', e'$ of the curve will be eliminated forming a straight line from $o$ to $c$, or from $o$ to $c'$. In such case if the springs which expand when movement is imparted in the direction of the arrow, Fig. 1, are not under initial compression, the line $d, e$ will be eliminated and there will be a straight line from $o$ to $c$, but if the other group of springs is not under initial compression, the line $d', e'$ will be eliminated and there will be a straight line from $o$ to $c'$.

The invention is capable of adaptation to different types of clutches and in clutch plates of different forms and it may have any desired number of groups of springs and any number of springs in the groups. The particular advantage of this invention results from the fact that the springs are in equilibrium and therefore the deflection curve always starts from the zero point of origin. This overcomes such defects and inaccuracies in workmanship that are liable to occur in quantity production and also variations in the strength of the springs and is therefore a highly important feature in production manufacture of clutch plates. The deflection curve always has an intermediate part where there is an increase in the load with no increase in the deflection and this may be availed of to dampen vibrations of a predetermined period by making the plate to produce this part of the deflection curve for the particular period. This is accomplished by varying the spacing accordingly in one of the members and it may be noted also that whereas I have shown the uniform spacing of the openings in the hub member and the variable spacing in the friction member equivalent results may be obtained by providing the uniform spacing in the friction member and the variable spacing in the hub member which amounts to a mere reversal of parts, the operation being in all respects substantially the same as herein set forth.

As hereinbefore explained, the invention is shown in a preferred embodiment for illustration and not for limitation and I reserve the right to use it in any form and for any purpose for which it is or may be adapted within the scope of the following claims.

I claim:

1. A clutch plate for friction clutches comprising a driving member and a driven member adapted for relative movement, and a plurality of springs operatively interposed under initial compression to form a cushion between said members with one end of each spring engaged with one member and the other end of each spring engaged with the other member and co-acting to produce initial equilibrium of all of said springs and with all of said springs adapted for engagement at each end with both of said members.

2. A clutch plate for friction clutches comprising a driving member and a driven member adapted for relative movement, and a plurality of springs operatively interposed under different degrees of initial compression to form a cushion between said members with one end of each spring engaged with one member and the other end of each spring engaged with the other member and co-acting to produce initial equilibrium of all of said springs and with all of said springs adapted for engagement at each end with both of said members.

3. A clutch plate for friction clutches comprising a driving member and a driven member adapted for relative movement, and a plurality of springs operatively interposed under initial compression to form a cushion between said members with one end of each spring engaged with one member and the other end of each spring engaged with the other member and adapted to deflect immediately upon the application of any load and with all of said springs adapted for engagement at each end with both of said members.

4. A clutch plate for friction clutches comprising a driving member and a driven member adapted for relative movement, and a plurality of springs operatively interposed under different degrees of initial compression to form a cushion between said members with one end of each spring engaged with one member and the other end of each spring engaged with the other member and adapted to deflect immediately upon the application of any load and with all of said springs adapted for engagement at each end with both of said members.

5. A clutch plate for friction clutches comprising a driving member and a driven member adapted for relative movement, and a plurality of groups of springs operatively interposed under initial compression to form a cushion between said members with all of said springs adapted for engagement at each end with both of said members, the groups of springs co-acting to produce initial equilibrium of the groups.

6. A clutch plate for friction clutches comprising a driving member and a driven member adapted for relative movement, and a plurality of groups of springs operatively interposed under different degrees of initial compression to form a cushion between said members with all of said springs adapted for engagement at each end with both of said members, the groups of springs co-acting to produce initial equilibrium of the groups.

7. A clutch plate for friction clutches comprising a driving member and a driven member, and a plurality of groups of springs operatively interposed under initial compression to form a cushion between said members with all of said springs adapted for engagement at each end with both of said members, the springs in each group being supplementary one to another and the groups of springs being complementary one to another.

8. A clutch plate for friction clutches comprising a driving member and a driven member, and a plurality of groups of springs operatively interposed under initial compression to form a cushion between said members with all of said springs adapted for engagement at each end with both of said members, the springs of each group being supplementary one to the other and the groups of springs co-acting to produce initial equilibrium of the groups so that the plate will start its deflection curve immediately upon the application of any load.

9. A clutch plate for friction clutches comprising a driving member and a driven member, a plurality of springs operatively interposed under initial compression to form a cushion between said members with all of said springs adapted for engagement at each end with both of said members and co-acting to produce initial equilibrium of said springs so that said plate will start its deflection curve immediately upon the application of any load, and means for causing expansion of some springs and contraction of other springs at the beginning of the deflection curve of the plate.

10. A clutch plate for friction clutches comprising a driving member and a driven member, a plurality of groups of springs operatively interposed under initial compression to form a cushion between said members with all of said springs adapted for engagement at each end with both of said members, the groups of springs co-acting as groups to produce initial equilibrium of the groups so that the plate will start its deflection curve immediately upon the application of any load, and means for causing one group to compress and another group to expand at the beginning of the deflection curve of the plate.

11. A clutch plate for friction clutches comprising a driving mmber and a driven member, said members being provided with spring pockets formed by openings therein, the openings in one member being differently spaced from the openings in the other member, and springs arranged in said pockets and engaging the end walls thereof under initial compression to form a cushion between said members.

12. A clutch plate for friction clutches comprising a driving member and a driven member adapted for relative movement, said members being provided with spring pockets formed by openings therein, the openings in one member being spaced with respect to the openings in the other member, and springs arranged in the pockets under initial compression with one end of each spring engaged with one member and the other end of each spring engaged with the other member and both ends of each spring adapted for engagement with both members, whereby the springs will assume a state of initial equilibrium and there will be relative movement of said members immediately upon the application of any load.

13. A clutch plate for friction clutches comprising a driving member and a driven member adapted for relative movement, said members being provided with spring pockets formed by openings therein, the openings in one member being differently spaced from the openings in the other member, and a spring in each of said pockets arranged to act in opposition to adjacent springs with one end of each spring engaged with one member and the other end of each spring engaged with the other member and both ends of each spring adapted for engagement with both members, whereby the springs will assume a state of initial equilibrium and there will be relative movement of said members immediately upon the application of any load.

14. A clutch plate for friction clutches comprising a driving member and a driven member, and a plurality of groups of springs operatively interposed under initial compression to form a cushion between said members, the corresponding end of each spring in one group normally engaging one member and out of engagement but adapted to engage the other member and the other ends of said group of springs normally engaging said other member and out of engagement but adapted to engage said one member, and the corresponding end of each spring in the other group normally engaging said other member and out of engagement but adapted to engage said one member and the other ends of said other group of springs normally engaging said one member and out of engagement but adapted to engage said other member, the springs in each group being supplementary one to another and the groups of springs being complementary one to another.

15. A clutch plate for friction clutches comprising a driving member and a driven member adapted for relative movement, and a plurality of springs operatively interposed under compression between said members with one end of each spring engaged with one member and the other end of each spring engaged with the other member and co-acting to produce initial equilibrium and both ends of each spring being adapted for engagement with both members, the engagement of both ends of selected springs with both members producing a pause in the relative movement of said members after the springs have passed out of equilibrium.

16. A clutch plate for friction clutches comprising a driving member and a driven member capable of relative movement, and a plurality of springs operatively interposed under different degrees of initial compression to form a cushion between said members, one end of each spring being engaged with one member and the other end of each spring being engaged with the other member and co-acting to produce initial equilibrium and both ends of each spring being adapted for engagement with both members, the engagement of both ends of selected springs with both members causing a pause in the relative movement of said members which begins after there has been some relative movement.

17. A clutch plate for friction clutches comprising a driving member and a driven member capable of relative movement, said members being provided with spring pockets formed by openings therein, groups of springs in said pockets, said springs being under compression and in equilibrium, the openings of each pocket overlapping with their ends out of registration, and means for causing one group of springs to expand and another group to compress at the beginning of the relative movement of the members and both groups to pause in the relative movement when the openings for the expanding group arrive at registration.

18. A clutch plate for friction clutches comprising a driving member and a driven member capable of relative movement, said members being provided with spring pockets formed by openings therein, groups of springs in said pockets, said springs being under compression and in equilibrium, the openings of each pocket overlapping with their ends out of registration, and means for causing one group of springs to expand and another group to compress at the beginning of the relative movement of the members and both groups to pause in the relative movement when the openings for the expanding group arrive at registration and both groups to compress in the relative movement thereafter.

HAROLD V. REED.